May 26, 1931.  H. M. CAMERON  1,806,741
SPRING SCALE
Filed Jan. 16, 1928   3 Sheets-Sheet 1
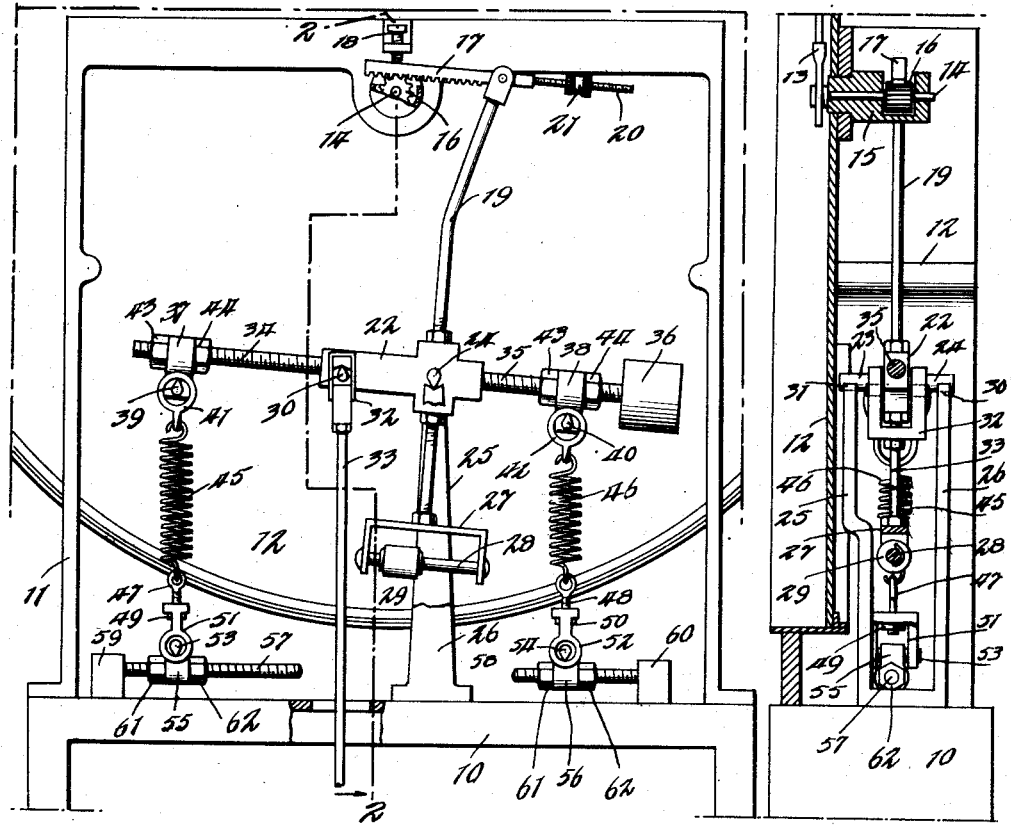
Fig.1.   Fig.2.
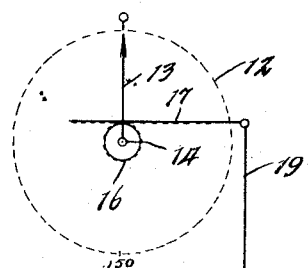
Fig.3.
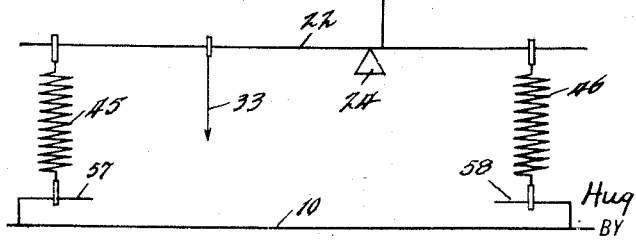
INVENTOR
Hugh. M. Cameron.
BY
J. S. Wooster
ATTORNEY May 26, 1931.  H. M. CAMERON  1,806,741
SPRING SCALE
Filed Jan. 16, 1928   3 Sheets-Sheet 2
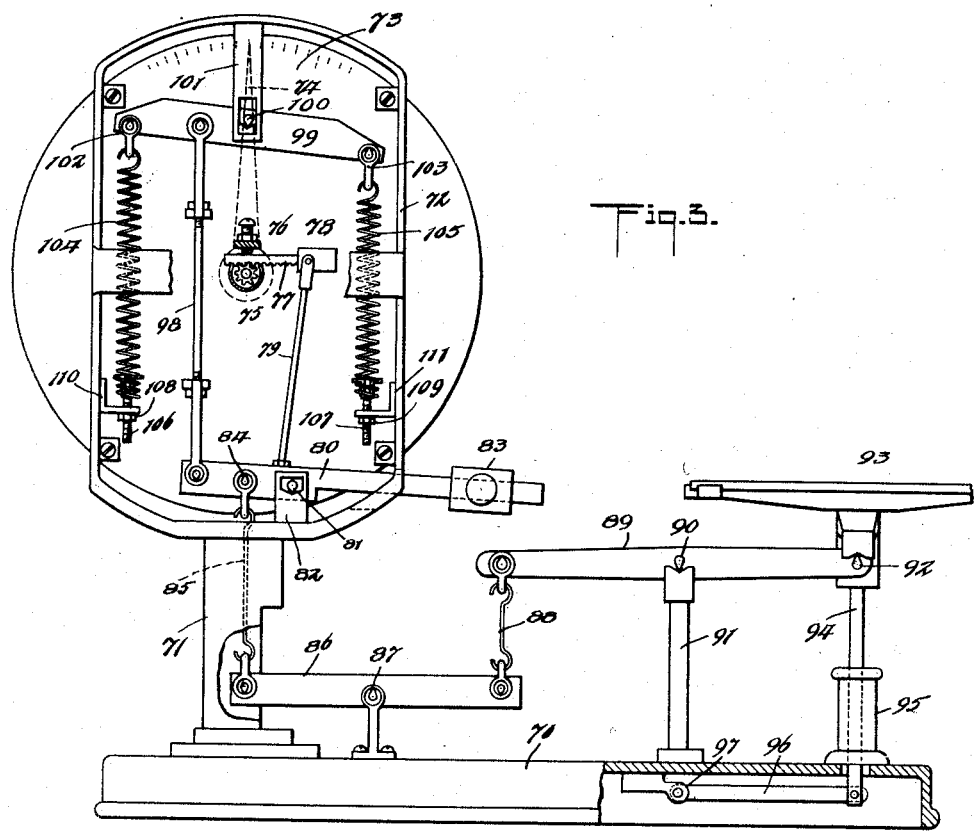
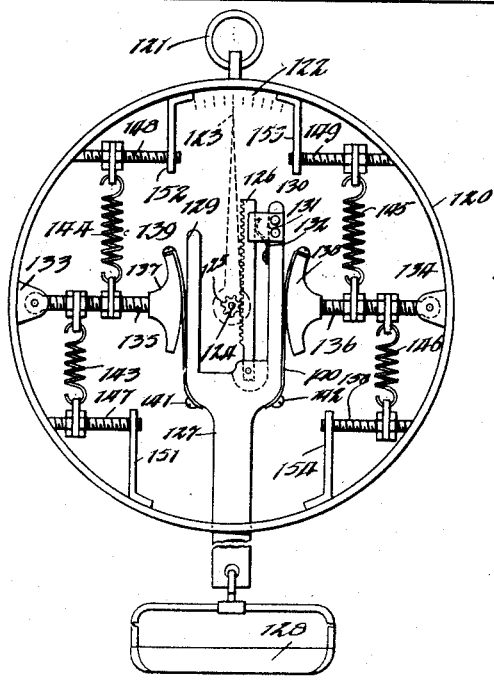
INVENTOR
Hugh M. Cameron.
BY
J. S. Wooster.
ATTORNEY Patented May 26, 1931

1,806,741

UNITED STATES PATENT OFFICE

HUGH M. CAMERON, OF WOODHAVEN, NEW YORK, ASSIGNOR TO JOHN CHATILLON & SONS, OF NEW YORK, N. Y., A CORPORATION OF NEW YORK

SPRING SCALE

Application filed January 16, 1928. Serial No. 247,055.

This invention relates to scales or weighing devices in which spring compensation is employed and has for an object to provide a method and means whereby the movement of the lever system, with which the springs are associated, will move a scale pointer completely around a circular dial in exact proportion to equal units of applied weight while using a true rack and pinion.

In such scales, the movement of the lever system, under the action of applied weight, is resisted by one or more load springs. These springs are usually very carefully made and this involves time and expense. Even when carefully made, the resistance of the load spring is not always proportional to the force applied to the beam. The scale reading for 100 lbs. may be correct but for 250 the reading may be fast or slow.

My invention comprises a method and means to compensate for the non-proportional resistance of the load spring as the load is applied. It comprises compensating means connected to the lever system under predetermined conditions of stress at no load, and adjusted at predetermined points in the system with respect to the center of the system. As the weight is applied, the non-proportional reaction of the load spring on the system will be eliminated by the substitution of the compensating means for the load spring.

Specifically the invention comprises two compensating springs attached to the system under a definite condition of stress at the no load position of the system and at such points with relation to each other that as the system is moved by the application of weight one of the springs will go through a series of non-proportional variations, either of contraction or expansion, while the other spring will pursue the opposite cycle of movements whereby the net effect of the two springs on the system will be balanced and the movement of the system will be proportional to the weight.

The invention is illustrated in the drawings of which,

Fig. 1 is a partial side elevation of a scale with the casing removed;

Fig. 2 is a vertical transverse section taken on the line 2—2 of Fig. 1;

Fig. 3 is an elevation, with portions broken away, of the invention applied to a counter scale;

Fig. 4 is a similar view showing the invention applied to a suspension scale of the strap type;

Fig. 5 is a diagram of the form of the invention shown in Fig. 1;

Figure 6:
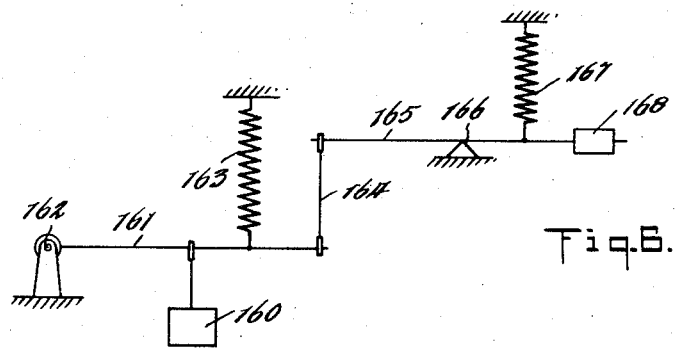

Figs. 6 to 10, inclusive, are diagrammatic illustrations of the invention applied to different types of lever systems such as may be employed in various kinds of scales or weighing devices.

As shown in Figs. 1, 2 and 5, the scale comprises a base plate 10, carrying a casing 11, and a dial plate 12. Over the dial swings a pointer 13, mounted on a shaft 14, revolvable in a bearing 15, and provided with a pinion 16. This pinion meshes with a true rack bar 17, against which an adjusting screw 18 bears. The rack bar 17 is pivoted on a rod 19 and is provided with a threaded end 20, on which a weight 21 is adjustably mounted to balance the weight of the rack bar 17. The rod 19 is fixed to the weighing lever 22, provided with knife edges 23 and 24 resting on bearing plates 25 and 26 rising from the base 10. A frame 27 is supported below the lever 22 and is provided with a bar 28 on which a weight 29 is adjustable to balance the weight of rod 19. The main beam is provided with knife edges 30 and 31, on which is hung a yoke member 32, supporting a rod 33 extending downwardly through the base 10 to a pan, platform or other weight supporting device. The end 35 of the main lever is threaded and is provided with a tare weight 36 which is adjustable thereon.

Slidable on the ends of the main lever are yokes 37 and 38, provided with knife edges 39 and 40, engageable by yoke rings 41 and 42. The yoke members 37 and 38 are held in adjusted position by means of pairs of nuts 43 and 44. Supported from the yoke rings 41 and 42 are springs 45 and 46, preferably on opposite sides of the pivot point of the weighing lever 22. The lower ends of the springs 45 and 46 are engaged by threaded eye members 47 and 48, adjustable by means of nuts 49 and 50 in yoke rings 51 and 52. These yoke rings engage with knife edges 53 and 54 on yoke elements 55 and 56, adjustable on horizontally disposed threaded rods 57 and 58, supported on lugs 59 and 60 on the base 10. The yoke members 55 and 56 are held in any adjusted position by means of nuts 61 and 62.

In the operation of the device and before the scale can be used for weighing, it is necessary to properly calibrate the springs 45 and 46 which are the compensating springs so that as the spring 46 lengthens upon the application of load through rod 33, compensating spring 45 which shortens upon application of load through rod 33 will so balance the characteristic variations of the spring 46 that the angular movement of the lever 22 is equal for equal units of applied weights for a great enough angle to cause a complete revolution of the pointer 13 over the dial plate 12. During this calibration, it is necessary to adjust the springs 45 and 46 with respect to each other and to the fulcrum of the lever 22. The springs are adjusted to maintain them parallel to each other and to the line of application of the load and, in the form shown, are kept in a vertical position. The spring 46 is first adjusted on the lever 22 in the proper position, with respect to the ratio of power between the platform and the dial, to be stretched a definite distance for the full scale deflection. The spring 45 is then connected to the opposite side of the scale lever 22 temporarily at any point. The adjusting nut 50, connected with the spring 46 is then tightened to pull on the string 46 and to move the lever sufficient to stretch the spring 45 to such an extent that during this motion of the beam, the pointer 13 has moved counter-clockwise from zero position on the scale a complete revolution back to zero again. When this amount of movement has been effected, the pointer is brought to zero by moving the yokes 37 and 55, connected to the spring 45, laterally in the same direction to adjust the spring 45 with respect to the spring 46 so that the pointer will rest exactly on zero with no load on the scale, with both springs substantially parallel.

After this the full capacity load of the scale, say 300 lbs., is supported from the rod 33 and the position of the pointer 13 is noted. If it is not exactly on the 300 lb. mark, then the spring 45 is again laterally shifted until the pointer rests on this mark while maintaining the spring 45 substantially parallel to the spring 46. The 300 lb. weight is then taken off and the pointer adjusted to zero by means of the tare weight 36.

After this a half load, of say 150 lbs., is then placed on the scale and the pointer reading noted. If the reading is a little bit over or under exactly 150 lbs., then first one spring is moved laterally as a whole, parallel to the other, until half the difference is made up and then the other spring is similarly adjusted until the other half is made up and the pointer reads exactly 150 lbs. The weight is then taken off and the zero reading checked by means of the tare weight 36.

By initially stretching the spring 45, as above stated, through the intermediary of the lever 22 and the spring 46 and having the springs in this condition when the lever is in its normal no load position, when the load is applied and the spring 46 lengthened a given distance, the spring 45 will have shortened an equivalent distance. If the two springs are substantially identical in strength, one will shorten as much as the other lengthens, whereas if the compensating spring 45 is weaker than the compensating spring 46, the above procedure will make it necessary for it to be moved out further on the lever than the spring 46 in order to balance the load spring movement.

In Fig. 3 is illustrated the invention embodied in a counter scale. This scale comprises a base 70, supporting a pedestal 71, on which a casing 72 and a dial plate 73 is mounted. Over the dial, a needle 74 swings. This needle is mounted on shaft 75, having a pinion 76 engaged by the rack bar 77 pivoted at 78 on an arm 79 connected to a lever 80, fulcrumed at 81, on a lug 82, fastened to the casing 72. The lever 80 has an adjustable tare weight 83 and is provided with knife edges 84, supporting a link 85 connected to lever 86, pivoted at 87 on knife edges. Lever 86 is connected by link 88 to the lever 89, pivoted at 90 on a pedestal 91, the other end of the lever 89 supporting a pan 93 on knife edges 92. Dependent from the pan 93 is a rod 94 extending through a boss 95, on the base 70 and connected to the lever 96, pivoted at 97 beneath the base.

The opposite end of lever 80 is connected by link 98 to a lever 99, pivotally supported on knife edges 100 from a strap 101, supported from the top of casing 72. The opposite ends of lever 99 are provided with knife edges to support yokes 102 and 103 on which are suspended springs 104 and 105. The lower ends of springs 104 and 105 are connected to threaded stems 106 and 107, adjustably connected by nuts 108 and 109 to brackets 110 and 111, fastened to the side of the fame 72. In this embodiment of the invention to a counter scale, the spring 105 lengthens upon application of the load and the spring 104 shortens and these springs are adjusted with respect to each other, to their point of connection to the lever 99, and to their initial states of stress in the no load position of the lever system, so as to produce the compensating action above described.

In Fig. 4, the invention is embodied in a hanging or suspension type of scale. This scale comprises a circular casing 120, having a suspension ring 121, and dial plate 122, over which a needle 123 swings. The needle or pointer is on a shaft 124, with a pinion 125, engageable by a rack bar 126, pivoted at its bottom end to a movable load frame 127, the lower end of which extends through the casing 120 and supports pan 128. The load frame 127 is provided with spaced upwardly projecting arms 129 and 130, on one of which a slotted guide plate 131 is mounted to engage opposite side faces of rack bar 126, and having a spring 132 bearing against the back of the rack bar 126 to hold it in mesh with the pinion 125.

Pivoted to lugs 133 and 134 on opposite sides of the casing 120 and extending inwardly are threaded rods 135 and 136. On the inner ends of these rods are disposed cam members 137 and 138 to which the upper ends of flexible straps 139 and 140 are connected. The lower ends of these straps are connected at 141 and 142 to the load frame 127.

Springs 143 to 146, inclusive, are arranged in pairs and disposed vertically between the rods 135 and 136 and threaded rods 147 to 150, inclusive, which rods are supported horizontally from the casing 120 and bracket plates 141 to 154, inclusive. The springs 143 to 146, inclusive, are adjustable laterally in the manner similar to the adjustment of springs 45 and 46 above described with respect to Fig. 1. Springs 144 and 145 lengthen upon application of the load and springs 143 and 146 shorten. These springs are adjusted with respect to each other and to their positions in the lever system to produce the compensating effect as above described.

In the diagram in Fig. 6 is represented the application of the invention to a lever system of the type which may be used in a sugar scale, for example. In this diagram the load 160 is suspended from lever 161 which is pivoted at 162 and is connected to the compensating spring 163 which lengthens upon application of the load. The other end of the lever 161 is connected by a link 164 to a lever 165, pivoted at 166, and connected to the compensating spring 167 which shortens upon application of the load. A tare weight 168 is connected to the lever 165. In this instance, the two springs are connected to different levers in the system, but are disposed on opposite sides of the center of the system and function in characteristically opposite manners to effect the compensating previously described. In any initial position of the system these springs are adjusted with respect to each other and with respect to the system as previously mentioned.

Figure 7:
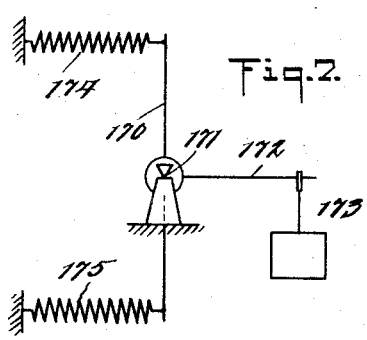

The diagram in Fig. 7 illustrates a lever system such as might be used in a bell crank type of scale. It comprises a lever 170, vertically pivoted at 171, and provided with an arm 172 at right angles thereto and supporting the load 173. The spring 174 which lengthens upon application of the load is connected to the upper end of the lever 170 and the spring 175 which shortens upon application of the load connected to the lower end of the lever. The adjustment of these springs is as above mentioned.

Figure 8:
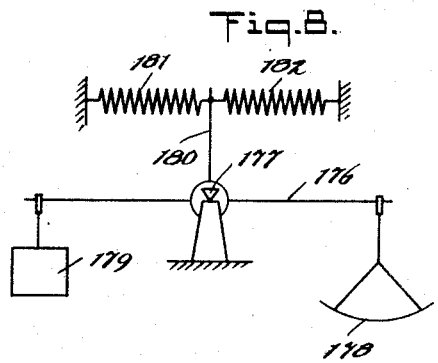

The diagram shown in Fig. 8 illustrates a type of lever system which might be employed in a spring balance. In this type, a lever 176 is horizontally pivoted at 177 and supports a load pan 178 at one end and the load 179 at the other. Projecting upwardly at right angles to the center of the lever 176 is a bar 180, to which the adjacent ends of springs 181 and 182 are connected. In this instance 181 is the spring which lengthens upon application of the load and 182 is the spring which shortens. The adjustment of these springs in accordance with the method of this invention will be apparent.

Figure 9:
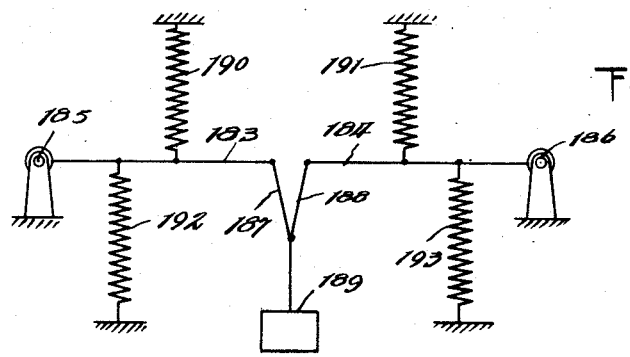

The diagram shown in Fig. 9 illustrates a lever system which may be employed in a hanging type of scale such as that shown more in detail in Fig. 4. In this instance the horizontally disposed levers 183 and 184 are pivoted at their outer ends 185 and 186 and connected at their inner ends to straps 187 and 188, which are joined to support a load 189. Springs 190 and 191 are disposed above the levers and lengthen upon application of the load, whereas springs 192 and 193 are the springs which shorten upon application of the load and are disposed below their respective levers as shown. The adjustment of these springs corresponds to the adjustment of the spring described with respect to Figs. 1 and 4.

Figure 10:
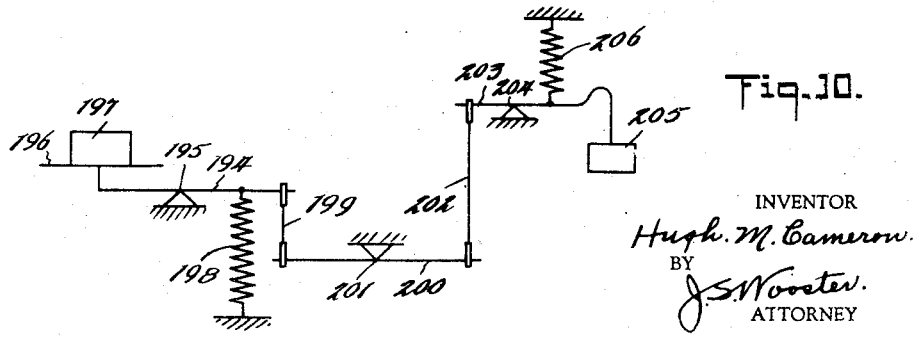

The diagram shown in Fig. 10 does not show a lever system particularly typical of any type of scale but merely illustrates the adjustability of this invention to any type of lever system, especially with regard to the points of application of the load spring and the compensating spring to the system. As shown, a lever 194, pivoted at 195 supports a pan 196 on which the load 197 is disposed. Spring 198 which lengthens on application of the load is attached to lever 194. A link 199 connects lever 194 with lever 200, pivoted at 201. The other end of lever 200 is connected by link 202 to one end of a lever 203, pivoted at 204, the opposite end of which is connected to a balance or tare weight 205. To this lever 203 is connected the compensating spring 206 which shortens on application of the load.

From a consideration of the various figures, it is apparent that this method is a general method, applicable to various types of lever systems employed in spring scales and similar weighing devices and that the springs can be applied almost anywhere in the leverage, only requiring that the springs be so adjusted with respect to their initial relative states of stress and to their position in the leverage as to have the characteristically opposite cycle of movement previously described, whereby the defects or variations of the one will be balanced out by opposite variations in the other.

I claim:

1. A scale mechanism comprising an indicating means, a lever system, means connecting said lever system and indicating means to actuate said indicating means, means for applying a load to the system, a spring attached to said lever system adapted to lengthen upon application of the load, a second spring attached to said lever system adapted to shorten upon application of the load, said second spring being lengthened sufficiently at the no load position by the first spring having been pulled from its normal position against the action of said second spring so that said second spring still has a tendency to shorten at the full load position, and means for shifting said springs toward and from the fulcrum of said lever system.

2. A scale mechanism comprising an indicating means, a lever, means connecting said lever and indicating means to actuate said indicating means, means for applying a load to said lever, a spring attached to said lever adapted to lengthen upon application of the load, a second spring attached to said lever adapted to shorten on application of the load, said second spring being lengthened sufficiently at the no load position by the first spring having been pulled from its normal position against the action of said second spring so that said second spring still has a tendency to shorten at the full load position, and means for shifting said springs laterally along said lever.

3. A scale mechanism comprising an indicating means, a lever fulcrumed intermediate its ends, means connecting said lever and indicating means to actuate said indicating means, means for applying a load to said lever, a spring on one side of the fulcrum of said lever adapted to lengthen upon application of the load, a second spring substantially parallel to said first spring on the opposite side of the fulcrum of said lever and adapted to shorten on application of the load, said second spring being lengthened sufficiently at the no load position by the first spring having been pulled down from its normal position so that said second spring still has a tendency to shorten at full load, and means for laterally shifting said springs along said lever.

4. A scale mechanism comprising a circular dial, a pointer pivoted at the center thereof, a lever fulcrumed intermediate its ends, means connecting said lever and pointer to actuate said pointer, means for applying a load to said lever, a spring on one side of the fulcrum of said lever adapted to lengthen upon application of the load, a second spring substantially parallel to said first spring on the opposite of the fulcrum of said lever from the first spring and adapted to shorten on application of the load, said second spring being lengthened at the no load position of the pointer by the first spring having been pulled down from its normal position a distance sufficient to move said pointer one complete revolution, and means for shifting said springs laterally along said lever.

5. A scale mechanism comprising a circular dial, a pointer pivoted at the center thereof, a lever fulcrumed intermediate its end, means connecting said lever and pointer to actuate said pointer, a load receiving platform, a rod connecting said platform with said lever on one side of its fulcrum, a spring on the opposite side of the fulcrum of said lever from said rod adapted to lengthen upon application of the load, a second spring substantially parallel to said first spring on the same side of the fulcrum of said lever as said rod adapted to shorten on application of the load, said second spring being lengthened at the no load position of the pointer by the first spring having been pulled down from its normal position a distance sufficient to move said pointer one complete revolution, and means for shifting said springs laterally along said lever.

6. A scale mechanism comprising a circular dial, a pointer pivoted at the center thereof, a lever fulcrumed intermediate its end, means connecting said lever and pointer comprising a true rack and pinion, a load receiving platform, a rod connecting said platform with said lever on one side of its fulcrum, a spring on the opposite side of the fulcrum of said lever from said rod adapted to lengthen upon application of the load, a second spring substantially parallel to said first spring on the same side of the fulcrum of said lever as said rod adapted to shorten on application of the load, said second spring being lengthened at the no load position of the pointer by the first spring having been pulled down from its normal position a distance sufficient to move said pointer one complete revolution, and means for shifting said springs laterally along said lever.

Signed at New York, in the county of New York, and State of New York, this 12th day of January A. D. 1928.

HUGH M. CAMERON.